United States Patent [19]
Schiel et al.

[11] Patent Number: 5,758,930
[45] Date of Patent: Jun. 2, 1998

[54] ELECTRONICALLY CONTROLLABLE BRAKE ACTUATION SYSTEM

[75] Inventors: Lothar Schiel, Hofheim; Ulrich Neumann, Rossdorf; Hans-Jorg Feigel, Rosbach; Andreas Klen, Bad Homburg, all of Germany

[73] Assignee: ITT Automotive Europe GmbH, Frankfurt am Main, Germany

[21] Appl. No.: 732,401

[22] PCT Filed: Apr. 26, 1995

[86] PCT No.: PCT/EP95/01590

§ 371 Date: Oct. 30, 1996

§ 102(e) Date: Oct. 30, 1996

[87] PCT Pub. No.: WO95/29830

PCT Pub. Date: Nov. 9, 1995

[30] Foreign Application Priority Data

May 3, 1994 [DE] Germany ............... 44 15 438.0

[51] Int. Cl.$^6$ .............. B60T 8/32; B60T 8/36; B60T 8/60; B60T 13/66
[52] U.S. Cl. .............. 303/113.4; 303/114.2; 303/115.2; 303/DIG. 4; 303/162; 188/358
[58] Field of Search .............. 303/115.2, 114.1, 303/114.2, 113.4, DIG. 3, DIG. 4, 14, 18, 15, 155, 113.1, 116.1, 116.2, 116.4, 162, 20, 115.1; 188/162, 358, 359, 356, 357; 60/545

[56] References Cited

U.S. PATENT DOCUMENTS

| 4,756,391 | 7/1988 | Agarwal et al. |
| 5,163,744 | 11/1992 | Tierney et al. |
| 5,246,283 | 9/1993 | Shaw et al. |

FOREIGN PATENT DOCUMENTS

| 317182 | 5/1989 | European Pat. Off. |
| 3322422 | 1/1985 | Germany |
| 3424912 | 1/1986 | Germany |

*Primary Examiner*—Douglas C. Butler
*Attorney, Agent, or Firm*—Plevy & Associates

[57] ABSTRACT

An electronically controllable anti-lock brake actuation system for automotive vehicles, including a pedal actuated dual-circuit master brake cylinder, and braking pressure generators actuatable by an electronic control unit. Each of the braking pressure generators has a piston slidable in a cylinder bore from an initial position, each piston separating a first working chamber, to which each one wheel brake of the vehicle is connected directly and the master cylinder is connected by way of a closable hydraulic connection, from a second working chamber and is connected to the master cylinder where the stepped piston is operable to achieve a braking pressure generation or boosting. In one embodiment, first and second electromagnetically operable separating valves are inserted in the connection between the first working chamber and the master brake cylinder, the connection between the master brake cylinder and the second working chamber being effected exclusively by way of the second separating valve, and the initial position of the stepped piston permits a return stroke in opposition to its actuating direction. In another embodiment, no connection exists between the first working chamber and the master brake cylinder. The second working chamber is connected to the master brake cylinder by way of a closable hydraulic connection, and the stepped piston is operable only so as to achieve a braking pressure generation. The closable connection is achieved via an electromagnetically operable valve interposed between the second working chamber and the master brake cylinder, and the connection is open in the valve's first switch position and, in the valve's second switch position, the master brake cylinder is isolated from the second working chamber and a connection is established between the first and the second working chamber. The initial position of the stepped piston permits a return stroke in opposition to its actuating direction.

41 Claims, 5 Drawing Sheets

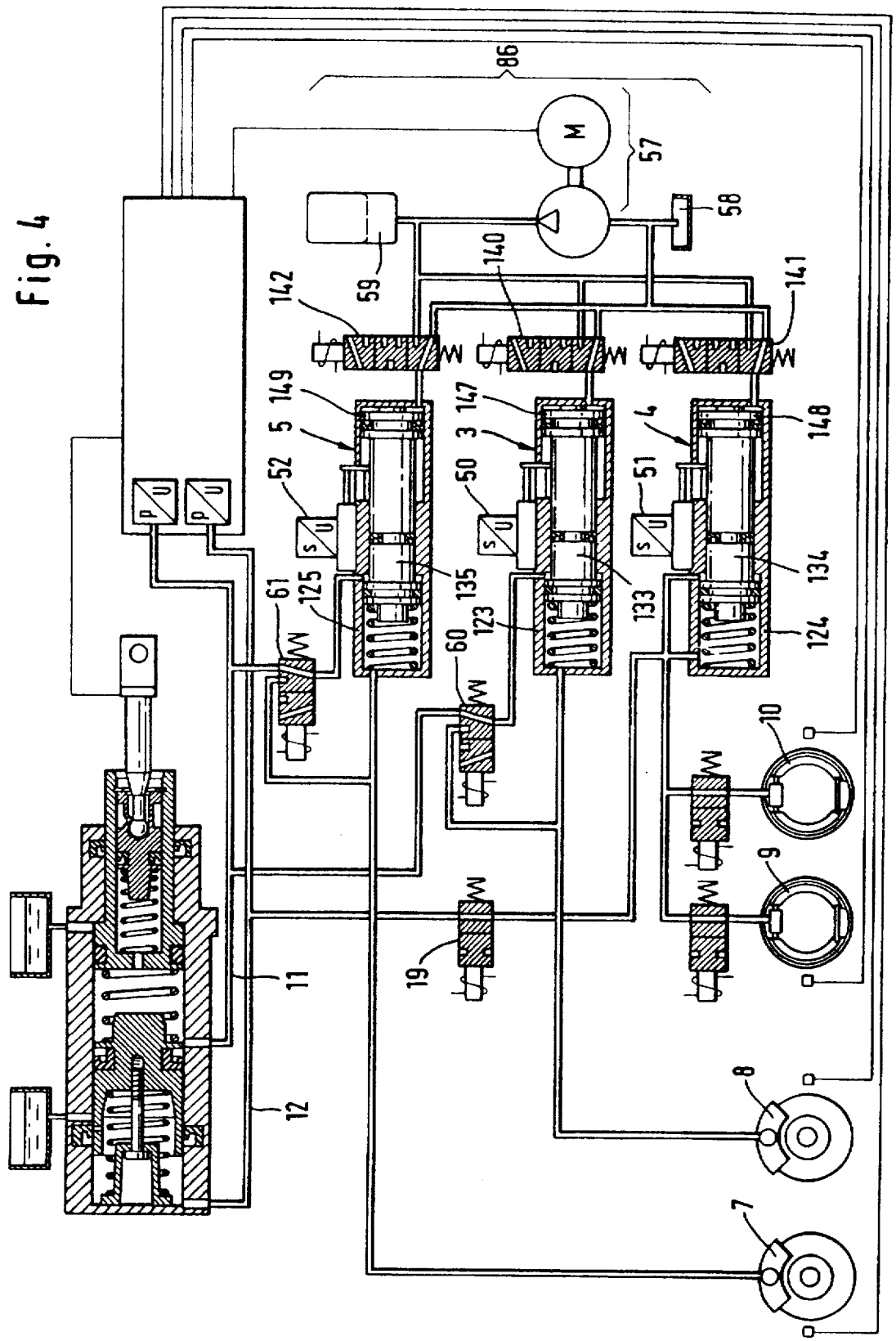

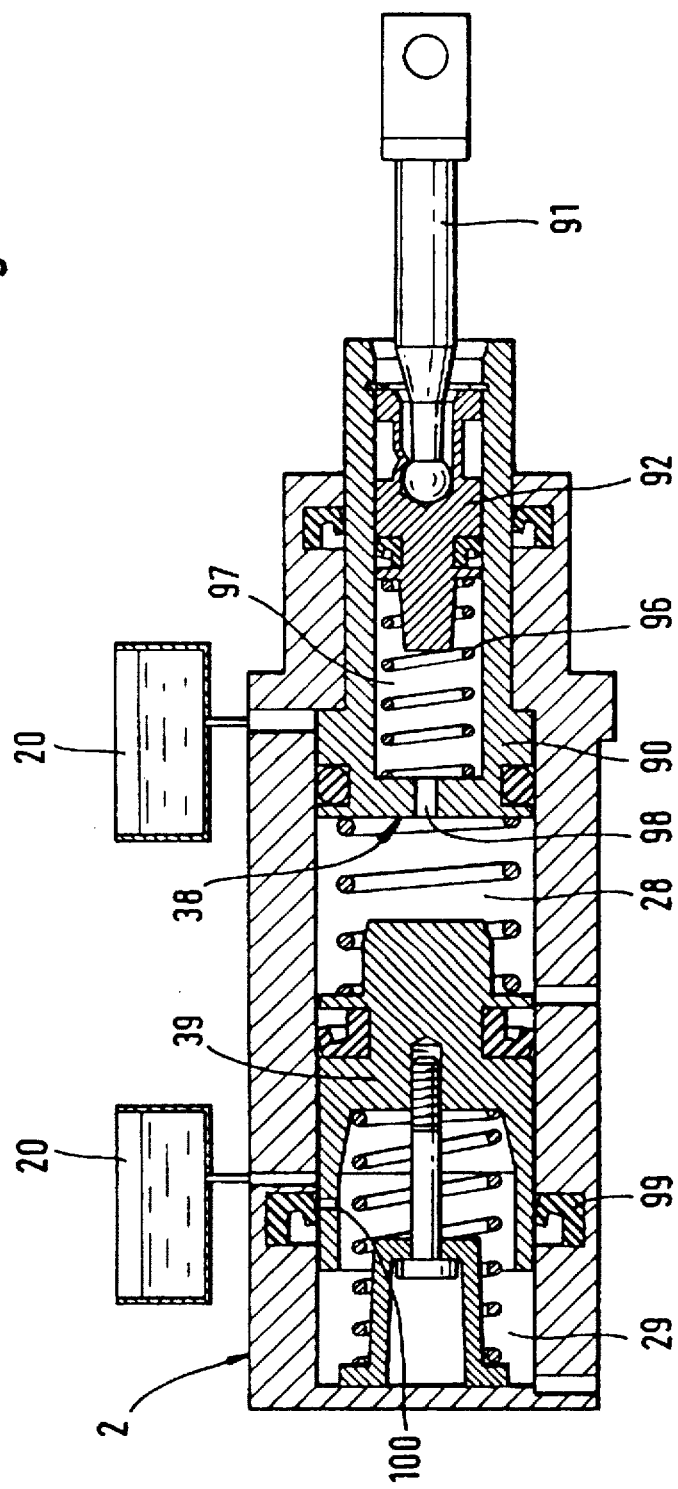

ELECTRONICALLY CONTROLLABLE BRAKE ACTUATION SYSTEM

FIELD OF THE INVENTION

The present invention relates to an electronically controllable anti-lock brake actuation system for automotive vehicles, including a dual-circuit master brake cylinder operable by an actuating pedal, braking pressure generators actuatable by an electronic control unit, each of the braking pressure generators having a piston slidable in a cylinder bore from an initial position, each piston separating a first working chamber, which is confined by the large piston surface and to which each one wheel brake of the vehicle is connected directly and the master cylinder is connected by way of a closable hydraulic connection, from a second working chamber which is confined by the small piston surface and is connected to the master cylinder, wherein the stepped piston is operable to achieve a braking pressure generation or boosting.

BACKGROUND OF THE INVENTION

DE-OS 34 24 912 discloses a brake actuation system of this type. In this known brake actuation system, the hydraulic connections between the braking pressure generators and the master brake cylinder are closed by way of bores (breathering bores) provided in the hydraulic cylinders of the braking pressure generators. During operation of the braking pressure generators, the bores are overridden by sealing elements arranged on the pistons.

Apart from the fact that pedal resetting without attenuation against the driver's foot occurs in this arrangement, the closable hydraulic connections do not permit reduction of the hydraulic pressure prevailing in the wheel brakes to almost zero bar in an ABS control operation because the necessary entire resetting movement of the braking pressure generator piston would cause opening of the above-mentioned bore, where the comparatively high pressure generated by the driver prevails.

Further, the valve assembly, formed of the combination of the bore (breathering bore) and the sealing element, is directly operated with a time delay by the electric drive due to the not negligible mass inertias. The time delay, in turn, causes the introduction of a considerable pressure fluid volume, thereby rendering impossible a pressure reduction to values proximate zero bar also for this reason. In particular control operations at low μ-values are thereby impaired.

SUMMARY OF THE INVENTION

Therefore, an object of the present invention is the improvement of an electronically controllable brake actuation system of the previously mentioned type so that the shortcomings involved especially in ABS control operations are prevented. More particularly, the pedal feel shall be improved, and the quality of ABS control shall be enhanced in addition.

According to the present invention, a first object is achieved because a first and a second electromagnetically operable separating valve is inserted in the connection between the first working chamber and the master brake cylinder, and in that the connection between the master brake cylinder and the second working chamber is effected exclusively by way of the second separating valve, and in that the initial position of the stepped piston permits a return stroke in opposition to its actuating direction.

A second object of the present invention, wherein no connection exists between the first working chamber and the master brake cylinder and the second working chamber is connected to the master brake cylinder by way of a closable hydraulic connection, and the stepped piston is operable only so as to achieve a braking pressure generation, is achieved in that an electromagnetically operable valve is interposed between the second working chamber and the master brake cylinder, and the connection is open in the valve's first switch position and, in the valve's second switch position, the master brake cylinder is isolated from the second working chamber and a connection is established between the first and the second working chamber, and in that the initial position of the stepped piston permits a return stroke in opposition to its actuating direction.

These measures render possible a compensation of the fluid volume conducted during ABS control by the driver into the wheel brake by way of the fluid volume of a piston rod which operates and projects from the braking pressure generator piston, thereby reducing the pressure to zero bar. The provision of a sensor device for identification of the driver wish for deceleration is particularly favorable.

In an embodiment of the present invention permitting low-cost manufacture, the separating valves are jointly operable.

Further, it is appropriate, especially in the second solution according to the present invention, that the valve is a three-way/two-position directional control valve.

Another embodiment ensuring low-cost manufacture and a high degree of seal-tightness of the three-way/two-position directional control valves in both operating positions (towards the master brake cylinder and the wheel brake) involves configuring the three-way/two-position directional control valves as double seat valves.

A controlled actuation of the separating valves (in particular with respect to the threshold values or gradients) which are opened only after a check for errors, is achieved in another preferred aspect of the present invention because the separating valves and the valves are operable indirectly by the output signals of the sensor device conducted to the electronic control unit.

An identification of the driver wish for deceleration, which can be determined directly without friction or closure travels, is rendered possible by the sensor device which is configured as a force sensor sensing the actuating force applied to the brake actuating pedal.

In a reliable brake actuation system, of the present invention which permits low-cost manufacture, the sensor device is at least one pressure sensor connected to the master brake cylinder. It is especially favorable that the pressure sensor is a part of the electronic control unit. The assembly is simplified because cable connections and plug connections are not provided outside the electronic control unit.

A preferred aspect of the present invention involves a low-friction conversion of a rotary movement into a linear movement, and the braking pressure generators are configured as hydraulic cylinders. The pistons of the hydraulic cylinders are operable by electrically actuatable d.c. motors, and the operation of the motors is effected by a roller-and-thread gear interposed between the pistons and the d.c. motor. It is appropriate that the spindle of the roller-and-thread gear and the shaft of the d.c. motor form a component part, or that the shaft of the d.c. motor is hollow and accommodates the spindle of the roller-and-thread gear. These arrangements permit an easy assembly of the braking pressure generators or a simple design of the spindle. In addition, the braking pressure generators have a short construction.

The d.c. motor is reversible in another preferred aspect of the present invention. High pressure reduction speeds even at low braking pressures are achieved by this measure. Further, such a design is little susceptible to friction effects during pressure reduction and has a reduced overall axial length.

To exactly define the inactive or ready position of the braking pressure generator piston, in another preferred aspect of the present invention, the braking pressure generator piston has a bipartite design and includes an annular piston and an internal piston which is slidable in the annular piston and is in force-transmitting connection with the spindle. The annular piston can be entrained by the internal piston.

In another feature of the present invention, the take-up of the pressure fluid volume conducted from the master brake cylinder during operation is ensured because the internal piston in the annular piston confines a hydraulic chamber which is connected to the first working chamber of the braking pressure generator.

A favorable transmission of force from the internal piston to the annular piston during operation of the braking pressure generator is achieved because the internal piston has a force-transmitting surface which interacts with a stop provided on the end of a duct that connects the chamber to the first working chamber.

In a design for high-dynamics operation where problems due to energy requirement peaks do not occur, the braking pressure generators are configured as hydraulic cylinders. The pistons of the hydraulic cylinders are operable by valve-controlled, pneumatically or hydraulically actuatable linear drives. Ease of control and a reduced expenditure in necessary sensors is achieved because the valves used for the actuation are configured as pressure control valves. Preferably, the actuation of the linear drives, which is especially a hydraulic actuation, is performed by one single pressure source to which further hydraulic consumers are connectible. Alternatively, the linear drives may be actuatable by high pneumatic pressure. A like design uses the appropriate storage capacity of the air and, above all, requires little mounting space.

In a preferred aspect of the present invention, controllability is further improved because travel/voltage converters are provided to determine the position of the pressure generator pistons or the axial movement of the spindle, or a means is provided to determine the angular position of the rotors of the d.c. motors.

In another preferred aspect of the present invention, a particularly good controllability, especially in the lower pressure range, is achieved in that the valves used for the actuation are integrated in a position control circuit processing that output signals of the means referred to hereinabove.

In another feature of the present invention, the controllability is further improved by means (pressure sensors) to sense the pressure generated by the pressure generators. The valves used for the actuation are integrated in a pressure control circuit which processes the output signals of the pressure sensors.

An optimum course of the pedal force/travel characteristic curve, irrespective of the pressure fluid take-up of the wheel brakes, can be achieved in another preferred aspect of the present invention in that the first piston (primary piston) of the master cylinder has a bipartite design which includes an annular piston and an internal piston guided in the annular piston. More particularly, the pedal force/travel characteristic curve can be adapted by the dimensioning of the internal piston diameter.

In still another favorable feature of the present invention, a defined initial position of the internal piston is ensured in that the internal piston is directly operable by the actuating pedal and is biassed by a compression spring in opposition of the actuating direction. Finally, in another preferred aspect of the present invention, the internal piston confines within the annular piston a hydraulic chamber which houses the compression spring and is connected to the first (primary) pressure chamber.

The constructive dimensioning of the hydraulic chamber greatly influences the transition from a braking operation with intact braking pressure generators to an emergency stop.

BRIEF DESCRIPTION OF THE DRAWINGS

The present invention will be explained in detail in the following description of three embodiments of the invention making reference to the accompanying drawings. In the drawings;

FIG. 4 is a schematic diagram of a third embodiment of the brake actuation system of the present invention;

FIG. 5 is a preferred embodiment of the master brake cylinder generator which can be used in the brake actuation system of the present invention.

DETAILED DESCRIPTION OF THE INVENTION

Figure 1:
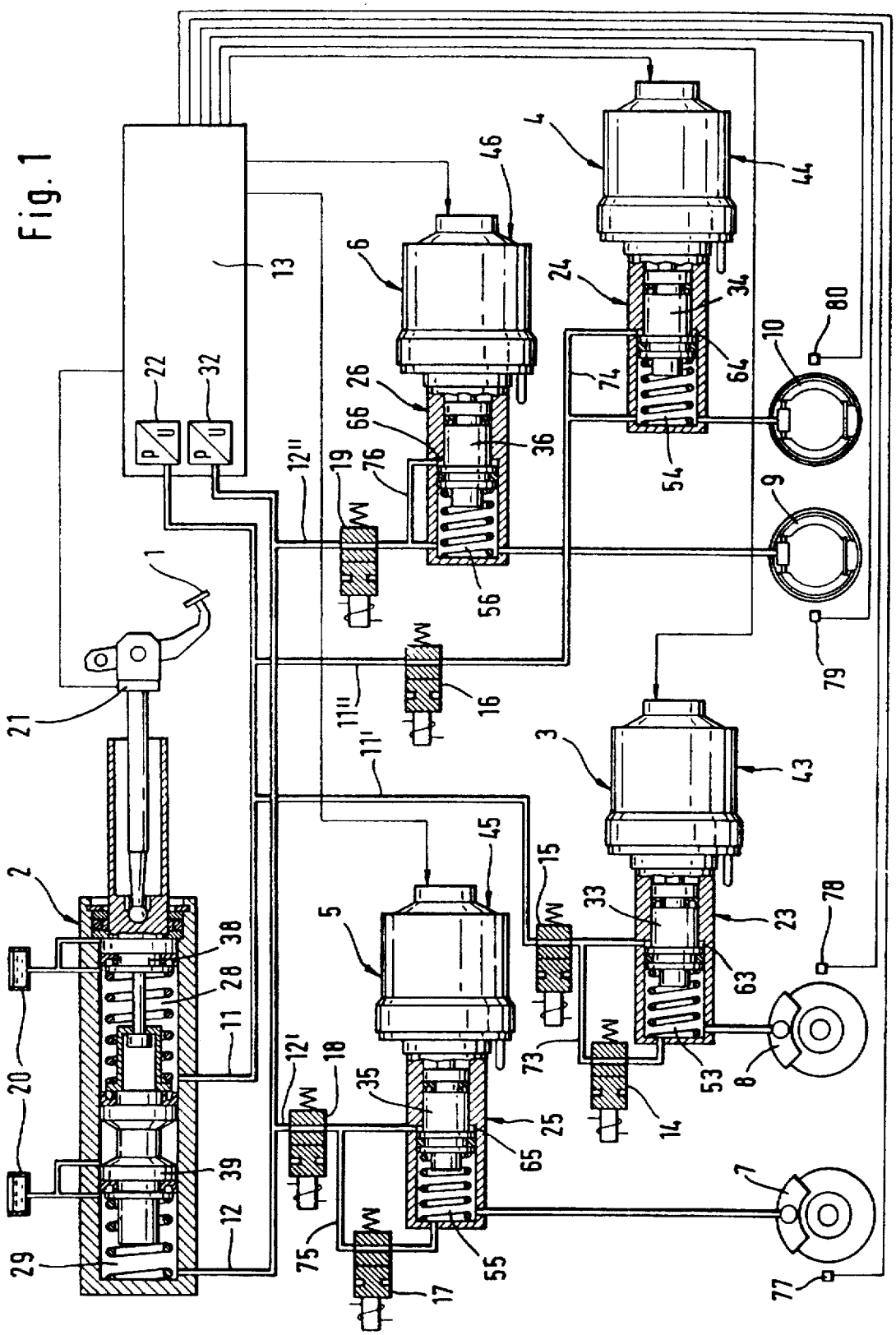
FIG. 1 is a schematic diagram of a first embodiment of the brake actuation system of the present invention.

The electronically controllable brake actuation system of the present invention, as shown in FIG. 1, is intended for use in a vehicle with front-wheel drive. The system includes a dual-circuit master brake cylinder or tandem master cylinder 2 operable by an actuating pedal 1. Tandem master cylinder has two isolated pressure chambers 28, 29 which are confined by two pistons 38, 39 and connected to an unpressurized pressure fluid supply reservoir 20. On the one hand, the first pressure chamber (primary pressure chamber) 28 is connected to an electrically operable first braking pressure generator 3 by way of a first hydraulic line 11. Generator 3 is connected to a hydraulic wheel brake 8 associated with the front axle. On the other hand, pressure chamber 28 is connected to an electrically operable second braking pressure generator 4 to which a hydraulic wheel brake 10 associated with the rear axle is connected. The second pressure chamber (secondary pressure chamber) 29 is connected, by way of a second hydraulic line 12, on the one hand, to an electrically operable third braking pressure generator 5, to which the other hydraulic wheel brake 7, associated with the front axle, is connected. On the other hand, pressure chamber 29 is in communication with an electrically operable fourth braking pressure generator 6 to which a second hydraulic wheel brake 9, associated with the rear axle, is connected. All four braking pressure generators 3, 4, 5, 6 have an identical design, and each generator includes a hydraulic cylinder 23, 24, 25, 26 in which a piston 33, 34, 35, 36 is slidable that is drivable by a preferably reversible d.c. motor 43, 44, 45, 56. The pistons 33, 34, 35, 36 isolate in the hydraulic cylinders 23–26 each one first working chamber 53, 54, 55, 56 from each one second working chamber 63, 64, 65, 66. While the hydraulic wheel brakes 8, 10, 7, 9 are connected directly to the first working chambers 53, 54, 55, 56 of the braking pressure generators 3–6, hydraulic connections 73, 74, 75, 76 are provided between the first working chambers 53–56 and the second working chambers 63–66 which are closable by electromagnetically operable separating valves 14, 17 at the braking pressure generators 3, 5 associated with the front axle. Further electromagnetically operable separating valves 15, 16, 17, 18, 19 permitting a separation of the braking pressure generators 3–6 from the tandem master cylinder 2 are inserted into line portions 11', 11", 12', 12" connected to the hydraulic lines 11, 12 and leading to the second working chambers 63–66. The joint actuation of the d.c. motors 43, 44, 45, 46 and the solenoid valves 14–19 is performed by an electronic control unit 13. As input signals, the output signals of a brake line switch 21, interacting with the actuating pedal 1, and the output signals of two pressure sensors 22, 32, are conducted to control unit 13. Pressure sensors 22, 32 are connected to the pressure chambers 28, 29 of the tandem master cylinder 2 and permit an identification of the driver wish for deceleration. It is particularly favorable that the pressure sensors 22, 32 are component parts of the electronic control unit 13. However, other means, such as a force sensor sensing the actuating force on the actuating pedal 1, may also be used to identify the driver wish for deceleration.

Further, wheel sensors 77, 78, 79, 80 are associated with the individual wheels (not shown). The output signals of the sensors, representative of the respective wheel speed, are conducted as further input quantities to the electronic control unit 13.

Figure 2:
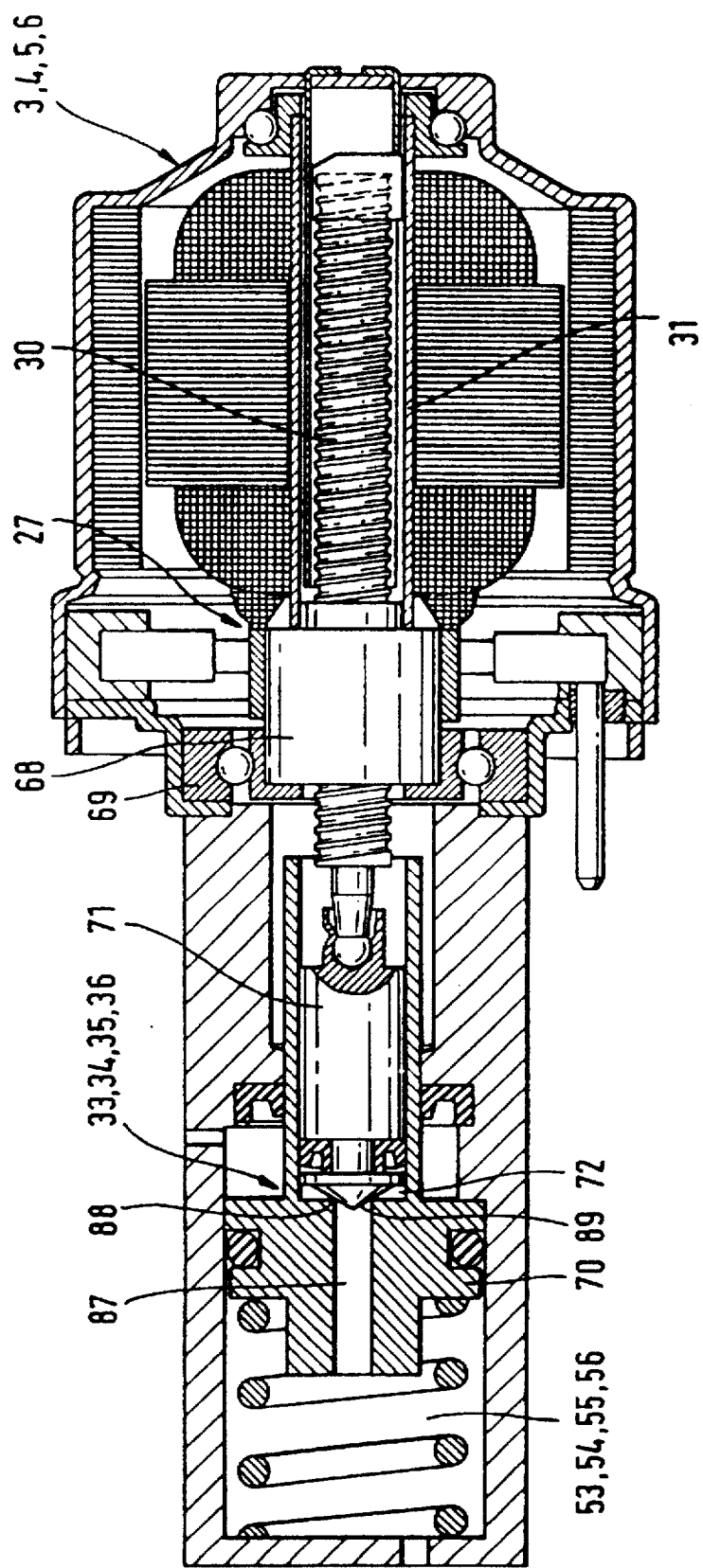
FIG. 2 is an axial cross-sectional view of a braking pressure generator which can be used in the brake actuation system of FIG. 1.

As can be seen in FIG. 2 specifically, the actuation of the piston 33, 34, 35, 36 of the braking pressure generator 3, 4, 5, 6 is carried out by a roller-and-thread gear or spindle-nut gear 27. A spindle 30 of the gear is arranged in an antitorsion manner in a preferably hollow shaft 31 of the d.c. motor 43, 44, 45,46. A spindle nut 68 that is in force-transmitting connection with the shaft 31 is mounted in a radial bearing, preferably in a roller bearing 69. The braking pressure generator piston 33–36 preferably has a bipartite design and includes an annular piston 70 confining the first working chamber 53, 54, 55, 56 and an internal piston 71 slidable in the annular piston and undetachably connected to the spindle 30. The annular end surface of the annular piston 70 remote from the first working chamber 53–56 confines the second working chamber 63, 64, 65, 66 and a channel 87 is provided in the annular piston to connect the first working chamber 53, 54, 55, 56 to a hydraulic chamber 72 designed in the annular piston 70 and confined by the internal piston 71. In an anti-lock control operation, chamber 72 takes up the pressure fluid volume discharged from the master brake cylinder 2 during pressure reduction. At the end of the channel 87 close to the chamber 72, a stop 88 is provided to interact with a preferably conical force-transmitting surface 89 on the internal piston 71. Surface 89 permits the annular piston 70 to be entrained by the internal piston 71.

Figure 3:
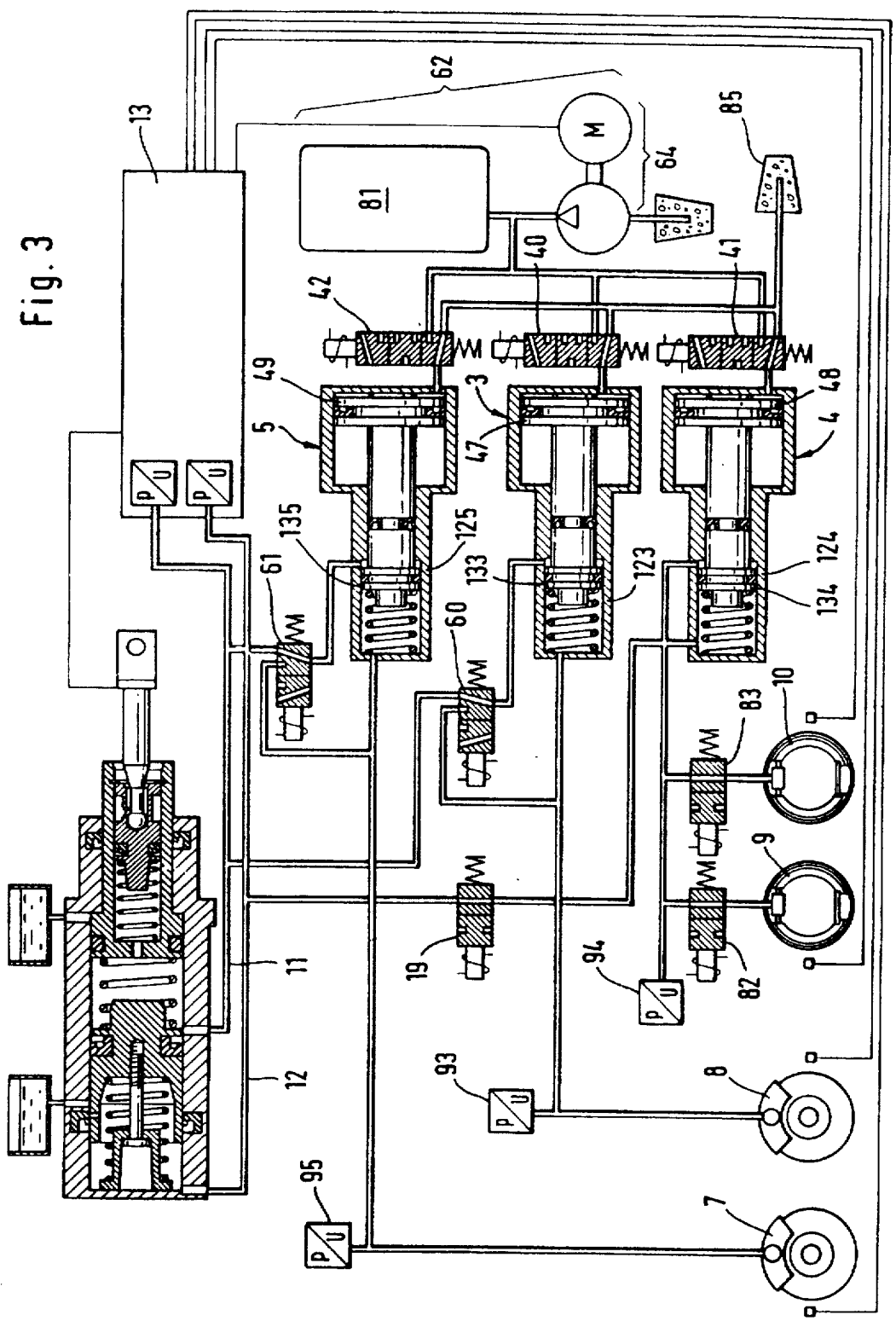
FIG. 3 is a schematic diagram of a second embodiment of the brake actuation system of the present invention.

In the second embodiment of the present invention shown in FIG. 3, electromagnetically operable three-way/two-piston directional control valves 60, 61 are interposed between the master cylinder 2 and the braking pressure generators 3, 5 associated with the front-axle wheel brakes 8, 7. Control valves 60, 61 substitute valves 14, 15 or 17, 18 used in the embodiment of FIG. 1 in terms of effect, and, preferably, they may be designed as double seat valves. In this arrangement, both wheel brakes 9, 10 associated with the rear axle are connected to the braking pressure generator 4 by the intermediary of each one electromagnetically operable two-way/two-position directional control valve 82, 83. The braking pressure generators 3, 4, 5 are configured as hydraulic cylinders 123, 124, 125 having pistons 133, 134, 135, 136 which are operable by valve-controlled, pneumatically actuatable linear drives 47, 48, 49. The linear drives 47, 48, 49 are connectible to a pneumatic pressure source 62 by way of electromagnetically actuatable three-way/three-position directional control valves 40, 41, 42. Pressure source 62 includes a pressure accumulator 81 and a motor-and-pump assembly 64 which charges the pressure accumulator 81. Preferably, the three-way/three-position directional control valves 40, 41, 42 are pressure control valves which, in their third switch position, separate the linear drives 47, 48, 49 from the pressure source 62 and connect the pressure source to the atmosphere (see muffler 85).

As can additionally be seen in FIG. 3, pressure sensors 93, 94, 95 are connected to the line portions leading to the wheel brakes 7–10. Pressure sensors 93–95 sense the pressures generated by the braking pressure generators 3, 4, 5, and the output signals of the sensors are conducted to the electronic control unit 13 which generates control signals for the pressure control valves 40, 41, 42 so that the valves are integrated in a pressure control circuit. However, it is also possible to design the pneumatic pressure control valves 40, 41, 42 so that their electromagnetic actuating force counteracts the pneumatic pressure introduced in the linear driver 47, 48, 49. Further, the use of the valves 82, 83 associated with the wheel brakes 9, 10 permits a multiplex pressure control on the rear axle.

FIG. 4 shows a third embodiment of the brake actuation system of the present invention, wherein valve-controlled, hydraulically actuatable linear drives 147, 148, 149 are used to actuate pressure generator pistons 133, 134, 135. Actuation takes place by way of hydraulic three-way/three-position directional pressure control valves 140, 141, 142 by a hydraulic pressure source 86, to which other hydraulic consumers in the vehicle are connectible. The hydraulic pressure source 86 includes a hydraulic motor-and-pump assembly 57, an unpressurized pressure fluid supply reservoir 58 connected to the suction side of the pump, and a hydraulic pressure accumulator 59 connected to the pressure side of the pump. In the first, unpressurized switch position of the control valves 140, 141, 142, there is a connection between the hydraulic linear drives 147, 148, 149 and the pressure fluid supply reservoir 58, while the connection between the hydraulic linear drives 147, 148, 149 and the pressure side of the pump or the pressure accumulator 59 is closed. In the second switch position, the linear drives 147, 148, 149 are isolated from the pressure fluid supply reservoir 50 and from the pump or the pressure accumulator 59 so that a pressure maintaining phase is achieved. In the third switch position, a connection between the linear drives and the pressure side of the pump or the pressure accumulator 59 and their simultaneous separation from the pressure fluid supply reservoir 58 is provided, so that pressure builds up in the wheel brakes 7–10. The position of the braking pressure generator pistons 133, 134, 135 is determined directly by travel/voltage converters 50, 51, 52. The output signals of the converters 50–52 are conducted to the electronic control unit 13 so that the pressure control valves 140, 141, 142 are integrated in a position control circuit.

In the preferred design of the tandem master cylinder 2 shown in FIG. 5, first (primary) piston 38 has a bipartite design and includes an annular piston 90 of large diameter. An internal piston 92, which is directly operable by the actuating pedal 1 by way of a piston 91, is slidable in piston 90. The internal piston 92, which is biassed in opposition to the actuating direction by way of a compression spring 96, confines within the annular piston 90 a hydraulic chamber 97 which is connected to the first (primary) pressure chamber 28 by an axial bore 98 in the annular piston 90. Because the tandem master cylinder 2 serves above all to generate signals indicative of the driver wish for deceleration, when the system is intact, the internal piston 92 is only shifted in opposition to the effect of the compression spring 96 during actuation, while the annular piston 90 remains in its rear position. Upon failure of the braking pressure generators 3, 4, 5, 6, the annular piston 90 performs an emergency function because it is entrained by the internal piston 92 and permits, by way of its larger surface, pressure increase in the wheel brakes connected to the primary pressure chamber 28.

In the embodiment shown in FIG. 5, the piston 39 confining the second (secondary) pressure chamber 25 interacts with a sealing sleeve 99 immovably arranged in the housing of the tandem master cylinder 2. Sealing sleeve 99, on actuation, is overridden by a radial bore 100 in the secondary piston 39 which, otherwise, establishes a connection between the secondary pressure chamber 29 and the pressure fluid supply reservoir 20.

The operation of the brake actuation system, shown especially in FIG. 1 of the drawing, is as follows:

When a braking operation is initiated by depression of the brake actuating pedal 1, the actuating condition is identified by the brake light switch 21 and signalled to the electronic control unit 13. The control signals of the control unit 13 cause switch-over of the separating valves 14, 16, 17, 19 and, thereby, separation between the master cylinder pressure chambers 28, 29 and the wheel brakes 7–10. However, there is a hydraulic connection between the tandem master cylinder pressure chambers 28,29 and the second working chambers 63,65 of the braking pressure generators 3,5 so that pistons 33,35 of the generators are acted upon by the pressure introduced by the driver in the tandem master cylinder 2. Pressure sensors 22 and 32 issue a second signal indicative of the driver wish for deceleration to the electronic control unit 13 which calculates the desired brake toques on the vehicle axles by way of the brake force distribution system installed in control unit 13. The control signals representative of the calculated brake torques are conducted to the d.c. motors 43,44,45,46 of the braking pressure generators 3,4,5,6 which initiate displacement of the braking pressure generator pistons 33,34,35,36 in the actuating direction and, thus, pressure increase in the wheel brakes 7–10. The pedal feel which the driver usually has during a braking operation is ensured by the fluid volume absorption of the working chambers 63,65 associated with the front axle. Braking pressure increase on the rear axle can be achieved exclusively by actuating the associated braking pressure generators 4,6.

Pressure reduction is performed by the return movement of the pistons 33,34,35,36. When locking of the front wheels is identified in an ABS control operation, for example, the electronic control unit 13 generates control signals which cause the separating valves 15,18 to close and the previously closed separating valves 14,17 to open. A pressure-maintaining phase is achieved by switching all separating valves 14,15,16,17,18,19 to their closed position. Pressure reduction during control is effected by opening the separating valves 14,17 and by an active reversal of the direction of rotation of the d.c. motors 43,45. A take-up of the pressure fluid volume conducted from the master brake cylinder 2 into the second working chambers 63,65 is permitted by increasing the chamber 72 due to active return movement of the internal piston 71 (FIG. 2).

Braking pressure control on the rear axle is achieved by actuating the d.c. motors 44,45 in both directions of rotation.

Consequently, ABS control is performed individually on each wheel in the control mode by way of the rotational wheel speed sensors 77,78,79,80, and braking pressure modulation on the rear axle can take place according to the "select-low" principle, for example.

Upon failure of the electronic system/vehicle electrical system, all valves adopt their de-energized condition. The two wheel brakes 7,8 associated with the front axle and the wheel brakes 9,10 associated with the rear axle are connected to the tandem master cylinder 2 by way of the normally open valves 14,15,16,17,18,19 so that the provisions mandated by law for failure of the electronic system are satisfied.

It will be understood that the embodiments described herein are merely exemplary and that a person skilled in the art may make many variations and modifications to the described embodiments utilizing functionally equivalent elements to those described. Any variations or modifications to the invention described hereinabove are intended to be included within the scope of the invention as defined by the appended claims.

What is claimed is:

1. An electronically controllable anti-locking brake actuation system for an automotive vehicle having a plurality of wheel brakes, said system comprising:

a pedal actuated dual-circuit master brake cylinder;

an electronic control unit;

a plurality of braking pressure generators actuated by said electronic control unit, each of said braking pressure generators having a stepped piston slidable in a cylinder bore in an actuating direction from an initial position and operable for achieving braking pressure generation or boosting, said stepped piston including a first piston surface and a second piston surface that is smaller than said first piston surface, said piston separating said cylinder bore of each of said braking pressure generators into a first working chamber and a second working chamber, said first working chamber confined by said first piston surface and said second working chamber confined by said second piston surface, each of said first working chambers connected directly to one of said wheel brakes of said vehicle and connected to said master brake cylinder through a first closable hydraulic connection, and each of said second working chambers connected to said master brake cylinder through a second closable hydraulic connection, wherein said stepped piston is capable of a return stroke in opposition to said actuating direction thereof;

a first electromagnetically operable separating valve; and a second electromagnetically operable separating valve;

wherein said first closable hydraulic connection includes said first and second electromagnetically operable separating valves, and said second hydraulic connection exclusively includes said second electromagnetically operable separating valve.

2. The electronically controllable brake actuation system according to claim 1, further comprising a sensor device for identifying a driver's wish for deceleration.

3. The electronically controllable brake actuation system according to claim 2, wherein each of said sensor devices produces and output signal which is conducted to said electronic control unit, and said electromagnetically operable valves are operable indirectly by said output signals of said sensor devices conducted to said electronic control unit.

4. The electronically controllable brake actuation system according to claim 3, further comprising a brake pedal coupled to said pedal actuated dual-circuit master brake cylinder, and wherein each of said sensor devices is configured as a force sensor which senses an actuating force applied to said brake pedal.

5. The electronically controllable brake actuation system according to claim 4, wherein at least one of said sensors comprises a pressure sensor connected to said master brake cylinder.

6. The electronically controllable brake actuation according to claim 5, wherein said pressure sensor is a part of said electronic control unit.

7. The electronically controlled brake actuation system according to claim 1, wherein said electromagnetically operable valves are jointly operable.

8. The electronically controllable brake actuation system according to claim 1, wherein said braking pressure generators having said stepped pistons are hydraulic cylinders, each of said hydraulic cylinders including an electrically drivable d.c. motor and a roller-and-thread gear interposed between said stepped piston and said d.c. motor for operating said stepped piston of each of said hydraulic cylinders.

9. The electronically controllable brake actuation system according to claim 8, wherein said d.c. motor includes a shaft and said roller-and-thread gear includes a spindle, said shaft and said spindle forming a component part.

10. The electronically controllable brake actuation system according to claim 9, wherein said shaft of said d.c. motor is hollow and accommodates said spindle of said roller-and-thread gear.

11. The electronically controllable brake actuation system according to claim 8, wherein said d.c. motor is reversible.

12. The electronically controllable brake actuation system according to claim 9, wherein said stepped piston of each of said braking pressure generators comprises a bipartite design which includes an annular piston and an internal piston slidable within said annular piston and in a force-transmitting connection with said spindle, wherein said annular piston is entrained by said internal piston.

13. The electronically controllable brake actuation system according to claim 12, wherein said internal piston in said annular piston confines a hydraulic chamber which is connected to said first working chamber of said braking pressure generator.

14. The electronically controllable brake actuation system according to claim 13, wherein said hydraulic chamber is connected to said first working chamber by a duct, said internal piston including a force-transmitting surface which interacts with a stop arranged on an end of said duct.

15. The electronically controllable brake actuation system according to claim 9, wherein each of said d.c. motors includes a rotor and position sensor means for determining the angular position of said rotor.

16. The electronically controllable brake actuation system according to claim 1, wherein said master cylinder includes a first piston of a bipartite design that has an annular piston and an internal piston guided in said annular piston.

17. The electronically controllable brake actuation system according to claim 16, wherein said internal piston is directly operable by a brake pedal and is biased by a compression spring in opposition to said actuating direction.

18. The electronically controllable brake actuation system according to claim 17, wherein said internal piston confines within said annular piston, a hydraulic chamber which houses said compression spring and is connected to a first pressure chamber defined by said master cylinder.

19. An electronically controllable anti-locking brake actuation system for an automotive vehicle having a plurality of wheel brakes, said system comprising:
a pedal actuated dual-circuit master brake cylinder;
an electronic control unit; and
a plurality of braking pressure generators actuated by said electronic control unit, each of said braking pressure generators having a stepped piston slidable in a cylinder bore in an actuating direction from an initial position and operable to achieve a braking pressure generation, said stepped piston including a first piston surface and a second piston surface that is smaller than said first piston surface, said piston separating said cylinder bore into a first working chamber and a second working chamber, said first working chamber confined by said first piston surface and said second working chamber confined by said second piston surface, each of said first working chambers connected to one of said wheel brakes of said vehicle and each of said second working chambers connected to said master brake cylinder through a closable hydraulic connection including an electromagnetically operable valve which is operative in a first switch position and in a second switched position;
wherein said closable hydraulic connection in said first switch position is open, and in said second switched position said master brake cylinder is isolated from said second working chamber and a connection is established between said first and said second working chambers, and wherein said stepped piston is capable of a return stroke in opposition to said actuating direction thereof.

20. The electronically controllable brake actuation system according to claim 19, further comprising a plurality of sensor devices for identifying a driver's wish for deceleration.

21. The electronically controllable brake actuation system according to claim 20, wherein each of said sensor devices produces and output signal which is conducted to said electronic control unit, and said electromagnetically operable valves are operable indirectly by said output signals of said sensor devices conducted to said electronic control unit.

22. The electronically controllable brake actuation system according to claim 21, further comprising a brake pedal coupled to said pedal actuated dual-circuit master brake cylinder, wherein each of said sensor devices is configured as a force sensor which senses an actuating force applied to said brake pedal.

23. The electronically controllable brake actuation system according to claim 21, wherein at least one of said sensor devices comprises a pressure sensor connected to said master brake cylinder.

24. The electronically controllable brake actuation according to claim 23, wherein said pressure sensor is a part of said electronic control unit.

25. The electronically controlled brake actuation system according to claim 19, wherein said electromagnetically operable valves are jointly operable.

26. The electronically controlled brake actuation system according to claim 19, wherein said electromagnetically operable valves are three-way/two-position directional control valves.

27. The electronically controllable brake actuation system according to claim 26, wherein said three-way/two-position directional control valves are configured as double seat valves.

28. The electronically controllable brake actuation system according to claim 19, wherein said braking pressure generators having said stepped pistons are hydraulic cylinders, each of said hydraulic cylinders being operable by a valve-controlled, fluid actuatable linear drive.

29. The electronically controllable brake actuation system according to claim 28, wherein said valve-controlled, fluid actuatable linear drive includes a plurality of pressure control valves.

30. The electronically controllable brake actuation system according to claim 28, wherein said linear drives are hydraulically actuated by a single pressure source, to which further hydraulic consumers are connectible.

31. The electronically controllable brake actuation system according to claim 28, wherein said linear drives are pneumatically actuated by high pneumatic pressure.

32. The electronically controllable brake actuation system according to claim 19, further comprising position sensing means for determining the position of said stepped piston of each of said pressure generators.

33. The electronically controllable brake actuation system according to claim 32, wherein said position sensing means are a plurality of travel sensors for determining the axial movement of said stepped pistons.

34. The electronically controllable brake actuation system according to claim 32, wherein said position sensing means are a plurality of travel/voltage converters.

35. The electronically controllable brake actuation system according to claim 29, further comprising position sensing means for producing an output signal which is used in determining the position of said stepped piston of each of said pressure generators, wherein said said pressure control valves used for the actuation are integrated in a position control circuit that processes said output signal of said position sensing means.

36. The electronically controllable brake actuation system according to claim 19, further comprising pressure sensing means for sensing pressure generated by said braking pressure generators.

37. The electronically controllable brake actuation system according to claim 36, wherein said pressure sensing means comprise pressure sensors.

38. The electronically controllable brake actuation system according to claim 36, wherein said pressure sensing means produces output signals which are used in determining the pressure generated by said pressure generators, wherein said pressure control valves used for the actuation are integrated in a position control circuit that processes said output signals of said pressure sensing means.

39. The electronically controllable brake actuation system according to claim 19, wherein said master cylinder includes a first piston of a bipartite design that has an annular piston and an internal piston guided in said annular piston.

40. The electronically controllable brake actuation system according to claim 39, wherein said internal piston is directly operable by a brake pedal and is biased by a compression spring in opposition to said actuating direction.

41. The electronically controllable brake actuation system according to claim 40, wherein said internal piston confines within said annular piston, a hydraulic chamber which houses said compression spring and is connected to a first pressure chamber defined by said master cylinder.

* * * * *